United States Patent
Georgeson et al.

(10) Patent No.: US 7,498,796 B2
(45) Date of Patent: Mar. 3, 2009

(54) MAGNETIC INDEXER FOR HIGH ACCURACY HOLE DRILLING

(75) Inventors: Gary E Georgeson, Federal Way, WA (US); Joseph L Hafenrichter, Redmond, WA (US); Raymond D Rempt, Woodinville, WA (US); Gregory L Clark, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/143,242

(22) Filed: May 9, 2002

(65) Prior Publication Data

US 2003/0212489 A1 Nov. 13, 2003

(51) Int. Cl.
*G01R 33/02* (2006.01)
*G01B 7/00* (2006.01)
(52) U.S. Cl. .......................................... 324/67; 324/260
(58) Field of Classification Search .................... 324/67, 324/326, 333, 228, 262, 263, 345, 307.17, 324/260, 207.26; 116/204; 273/141 A, 141; 446/129; 200/60.09, 61.1, 60.1; 335/285, 335/302; 33/355 R; 362/252; 346/141 R, 346/143 C, 143, 141; 29/709; 403/11, 13; 318/587; 414/730
See application file for complete search history.

(56) References Cited

U.S. PATENT DOCUMENTS

| | | | |
|---|---|---|---|
| 1,971,189 | A | 8/1934 | Leibing |
| 2,346,773 | A | 4/1944 | McBride et al. |
| 2,600,857 | A | 6/1952 | De La Mater |
| 2,807,780 | A | 9/1957 | Ludwig et al. |

(Continued)

FOREIGN PATENT DOCUMENTS

DE 508347 9/1930

(Continued)

OTHER PUBLICATIONS

Honeywell Sensor Products, Three-Axis Magnetic Sensor Hybrid, pp. 4.

(Continued)

*Primary Examiner*—Reena Aurora
(74) *Attorney, Agent, or Firm*—Harness, Dickey & Pierce, P.L.C.

(57) ABSTRACT

A magnetic indexer for locating a device producing a magnetic field in a blind or inaccessible position of a work piece. A magnet is initially placed on a first side of the work piece such that a magnetic field produced by the magnet extends through the work piece and substantially perpendicular to a surface of the work piece. A device comprising a plurality of probes for sensing magnetic fields is then positioned over a second surface of the work piece. The probes are then moved over the second surface to determine the location of the axis of the magnet via the strength of the sensed magnetic field. Once the position of the axis of the magnet is determined, the work surface is either marked or worked on through the platform on which the probes are positioned. In particular, a hole may be accurately drilled or otherwise formed directly over the magnet even when the first surface of the work piece cannot be seen. Additionally, the present invention allows a very accurate positioning of a work tool on the second surface without the need to first visualize the first surface of the work piece.

11 Claims, 3 Drawing Sheets

U.S. PATENT DOCUMENTS

| | | | |
|---|---|---|---|
| 2,844,977 A | | 7/1958 | Morse |
| 4,229,696 A | * | 10/1980 | Gustafson .............. 324/207.26 |
| 4,388,890 A | | 6/1983 | Wester et al. |
| 4,565,967 A | * | 1/1986 | Eisenbrandt et al. .......... 324/95 |
| 4,653,011 A | * | 3/1987 | Iwano ........................ 700/258 |
| 5,172,055 A | | 12/1992 | Horn |
| 5,432,434 A | * | 7/1995 | Tugwell ...................... 324/67 |
| 5,434,500 A | * | 7/1995 | Hauck et al. .................. 324/67 |
| 5,445,000 A | | 8/1995 | Brown et al. |
| 5,465,500 A | | 11/1995 | Nammoto |
| 6,084,402 A | * | 7/2000 | Smart ........................ 324/220 |
| 6,087,824 A | | 7/2000 | Shiao |
| 2002/0050043 A1 | | 5/2002 | Sarh |

FOREIGN PATENT DOCUMENTS

GB  2 363 462 A  12/2001

OTHER PUBLICATIONS

U.S. pending utility patent application filed Sep. 5, 2003 entitled Apparatus and Methods for Magnetic Through-Skin Sensing, Arntson.

Pending independent claims from U.S. Appl. No. 10/448,560, filed May 30, 2003, Pedigo et al.

* cited by examiner

MAGNETIC INDEXER FOR HIGH ACCURACY HOLE DRILLING

FIELD OF THE INVENTION

The present invention relates to a system to precisely form holes, and more particularly to a system to locate a device and indicate a location to form a hole.

BACKGROUND OF THE INVENTION

It is often desirable to locate, with a high degree of accuracy and specificity, locations in a blind area of a working surface. In particular, if it is desired to affix together two portions of a structure, where only an outside surface is visible to a work person, it is often difficult, if not impossible, to precisely and reproducibly place a fastener between the two portions. This is particularly relevant in regards to aircraft where the skin of the aircraft is placed over an internal frame structure and must be affixed thereto. Once the skin is in place, it is often very difficult to properly locate a fastener that must first go through the skin to be affixed to the internal structure of the aircraft. This situation arises in other construction and manufacturing instances as well.

One solution has been the attempt to back drill from inside the structure. That is, to have a work person physically place themselves inside the structure and then cut through the substructure through the skin. This, however, often creates impreciseness in the hole creation. For example, the full sized hole which is formed normal to the skin of the air craft, which is following the back drilled pilot hole, may be angular. That is because the hole formed from the inside of the skin can not be easily formed exactly normal to the skin of the aircraft. In particular the internal structures of the part may not be normal to the skin while the hole on through the outside of the skin must be normal to the skin. Furthermore, it is very hard on the work person who must crawl into the usually small areas to produce the holes.

Backmarkers are widely used in the aircraft industry to transfer holes from the understructure to the outside surface. Backmarkers consist of a long split piece of thin metal with a pin on one side and a hole on the other that are in alignment. The pin side is slipped under the skin to line up with a pilot hole, in the understructure, and a pilot hole is drilled into the outer skin. This method does not work on wide parts and thick parts. Deflection of the split plates and the difficulty of installing the device on thick parts limits the use to thin sheet metal areas near the edge of the skin.

Another method is to use a probe or locating device to determine a precise position on the skin. In particular, the device is first programmed with locations in three dimensional space. Therefore, when a surface is placed within reach of the probe, the probe can determine the location of a point which the probe touches. This, however, requires an extensive preprogramming and precise placement of the surface which is to be probed. Using such special orientation probes increases time and manufacturing costs for many applications. Also, probing the understructure before drilling has several shortcomings. When a skin is placed over a built up structure, the weight of the skin causes the structure and tooling to deform. It is possible that probed holes will move between measurements and drilling. Also, temperature changes between probing and drilling can cause the holes to not align due to growth or shrinkage to the part and differences in growth between the upper and lower surfaces. Fastener induced growth and coldworking of holes in aircraft structure can also shift positions of the holes between probing and drilling.

In aircraft construction, it is often critical to produce a hole, for fastening a portion of the airframe to another portion, within hundredths of an inch. One specific method of construction for internal airframe structure involves the use of sine wave topography on the internal structures or beams of the aircraft. To ensure a sufficiently strong connection, which will withstand the extreme stresses that an aircraft will encounter, the fastener must be placed at a peak of the sine wave. Therefore, placement of a fastener must be extremely precise to ensure that a peak is hit, rather than a valley or a portion adjacent to the peak. It is also desirable to precisely locate edges of hidden structure pieces. In this and many other applications, the precise locating of the fastener becomes critically important.

SUMMARY OF THE INVENTION

The present invention is directed to a magnetic indexer which locates a device that is producing a magnetic field in a blind or inaccessible position. A magnet is initially placed on one side of the work surface such that a magnetic field produced by the magnet extends through the work surface such that the axis of the magnetic field is substantially perpendicular to the work surface. The device, comprising a plurality of probes which are affected by magnetic fields, is positioned over the opposite side of the work surface. The probes are then moved over the work surface to determine the location of the magnet. Once the position of the magnetic field axis is determined, the work surface is either marked or worked on through the platform on which the probes are positioned. In particular, a hole may be reproducibly placed directly over the magnet even when the underside of the work piece is not visible. Additionally, with the present invention, a work tool may be very accurately positioned on the work surface without seeing the underside of the work surface.

A first embodiment of the present invention includes a system for determining a location of a device that produces a field having varying strengths depending upon a lateral distance from the device. The system comprises a probe adapted to be affected by the varying strength of the field produced by the device and which assists in locating the device. As the probe is moved a processor determines the field strength affecting the probe. A confirmation system provides a physical confirmation that the processor has determined the location of the device with the probe.

A second embodiment of the present invention includes a system to determine a location of a device through a surface. The system comprises a device, which produces a magnetic field, positioned on a first side of the surface. A probe is positioned on a second side of the surface affected by the field. A processor determines the affect produced in the probe by the field. The processor is adapted to determine the position of the device based upon the affect of the field on the probe.

The present invention also provides a new method to precisely locate a position. The method involves locating a device, which produces a field, with a probe affected by the field. The device is placed on a first side of a surface. A field is then produced with the device through the surface. A probe is used on a second side of the surface to determine a center axis of the field and to provide a physical confirmation of the center axis of the field. Once the location of the center axis of the field is determined then work may be performed at a precise and predetermined location.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
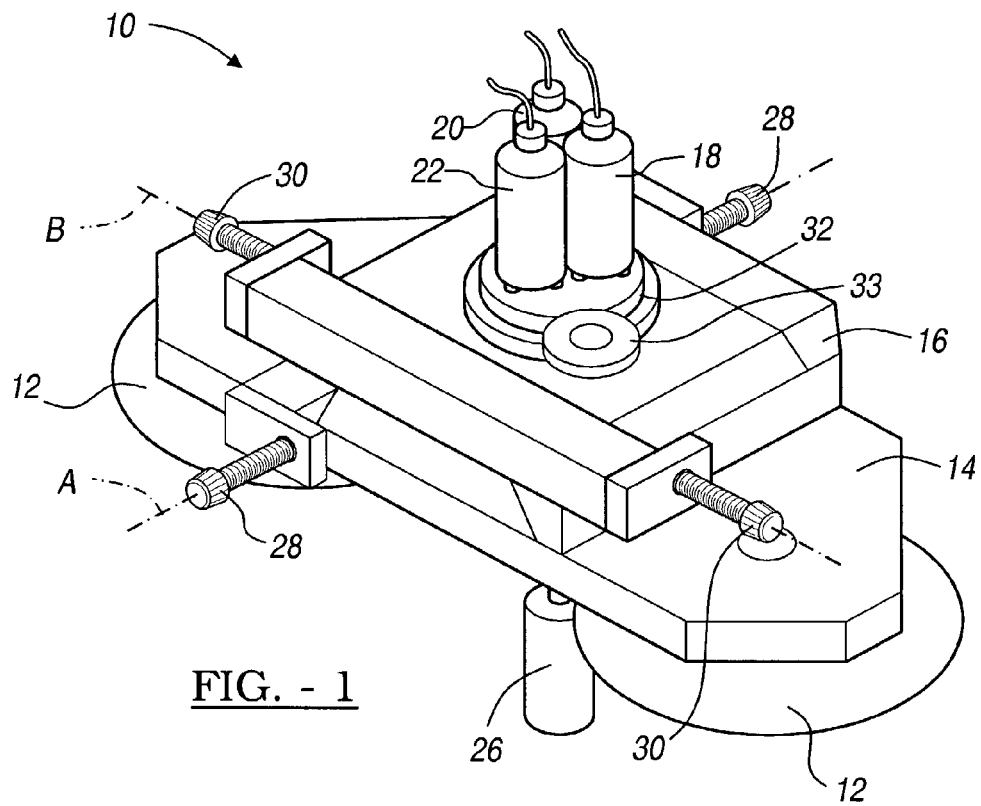
FIG. 1 is a perspective view of a preferred embodiment of the digital magnetizer according to the present invention.
Figure 2:
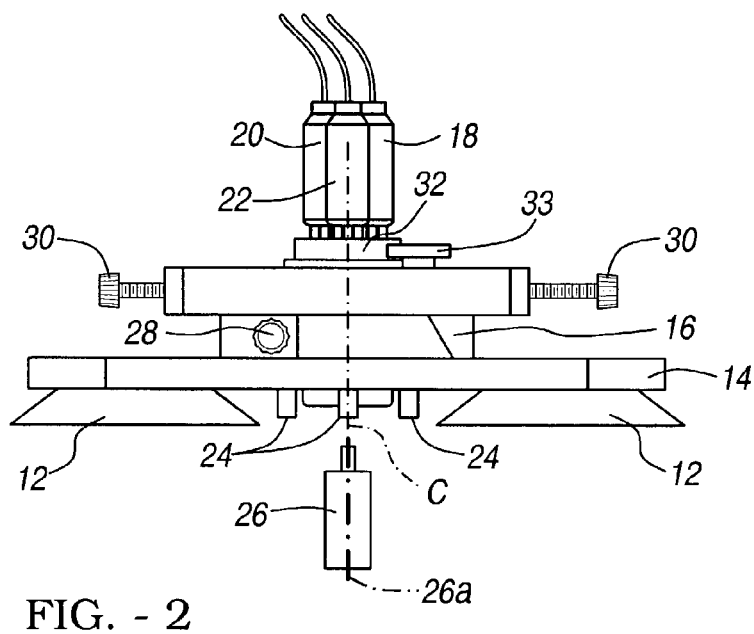
FIG. 2 is a side elevational view of the magnetic indexer according to the present invention.

With reference to FIGS. 1 and 2, a magnetic indexer 10 in accordance with a preferred embodiment of the present invention is shown. The magnetic indexer 10 includes a vacuum attachment member 12, a work piece platform 14, a probe platform 16 and a plurality of probes 18, 20, and 22. The vacuum attachment member 12 generally includes members in which a vacuum may be created, so as to affix the work piece platform 14 to a work piece (described further herein). It will be understood, however, that any appropriate system suitable for attaching the work piece platform 14 to a work piece may be used. Extending generally perpendicular from the work piece platform 14 are stabilizing members 24 (FIG. 2) which engage the work piece to ensure that the work piece platform 14 is substantially parallel to the work piece. A magnet 26 is positioned on an opposite side of the work piece from the work piece platform 14. The magnet 26 produces a magnetic field which has a central magnetic axis 26a. Extending from the work piece platform 14 is the probe platform 16. The probe platform 16 is moveable relative to the work piece platform 14. A first set of adjustment screws 28 allow for movement of the probe platform 16 in a first axis A. A second set of adjustment screws 30 allow for adjustment of the probe platform 16 along a second axis B. Therefore the probe platform 16 may be moved, relative to the work piece platform 14, using the first set of adjustment screws 28 and the second set of adjustment screws 30, in two dimensions.

Affixed to the probe platform 16 are probes 18, 20 and 22. The probes 18, 20 and 22 are spaced apart so that the probes define a center axis C. The center axis C is an axis equidistant from, but parallel to, an axis along which each of the probes 18, 20 and 22 extend.

The probes 18, 20, 22 are affixed to a secondary probe platform 32 which is affixed to the probe platform 16 with a fastener 33. This allows the secondary probe platform 32 to be removed from the probe platform 16 without moving the work piece platform 14.

Figure 3:
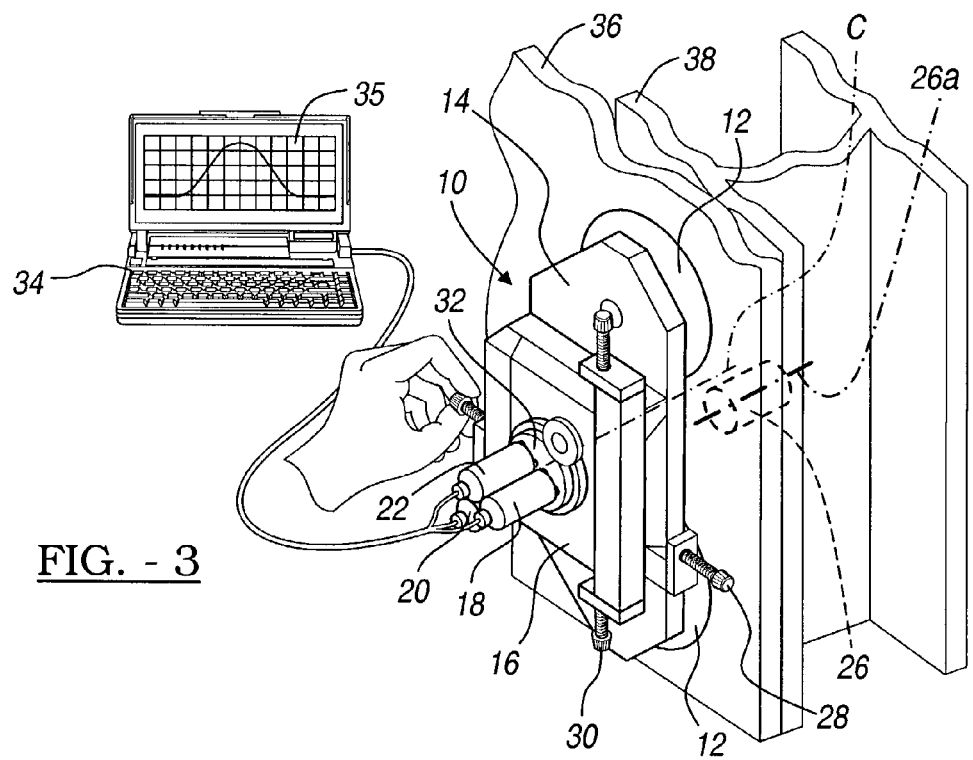
FIG. 3 is a perspective view of the magnetic indexer in use.
Figure 4:
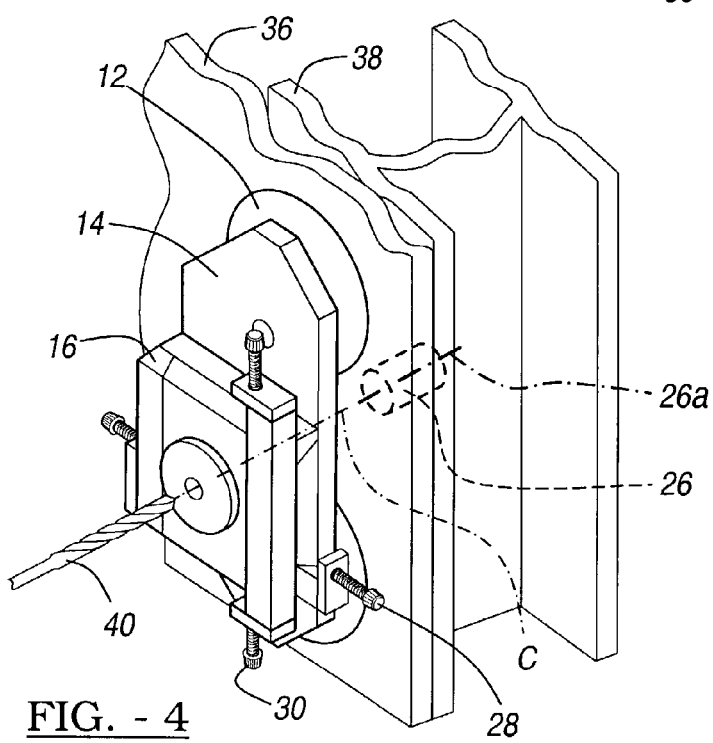
FIG. 4 is a perspective view of the platform of the magnetic indexer after it has been positioned.

With reference to FIGS. 3 and 4, the effect of each probe 18, 20, 22 is determined by a processor 34. The processor 34 may be any appropriate processor, however, a microprocessor is able to determine the effect of the magnetic field on each of the probes 18, 20, 22 and to determine the relative orientation of each of the probes 18, 20, and 22 to the magnetic field. The processor's 34 determination is displayed on a display device 35. In particular, a CRT or LCD screen may be used as the display device 35. The processor 34 can display on the display-device 35 a confirmation that the center axis C is co-linear with the magnetic axis 26a The magnetic indexer 10 is affixed to a surface or work piece 36 with the vacuum attachment members 12. As discussed above, the vacuum attachment members 12 may affix the work piece platform 14 to the work piece 36 through any appropriate means. For example, a vacuum may be created within the vacuum attachment members 12 allowing the work piece platform 14 to be held in place. It will also be understood that more than two vacuum attachment members 12 may be used depending upon the size of the work piece platform 14.

Below the work piece 36 is a sub-structure or support beam 38. At the position where a hole must be produced, a magnet 26 has been placed. The magnet 26 is placed on the beam 38 in a preliminary manufacturing step before the work piece platform 14 is secured to the work piece 36. Because of this, the magnet 26 is able to be easily placed in the exact position where a hole must be produced for an attachment between the work piece 36 and the beam 38. The magnetic indexer 10 is placed over a position relatively close to where the hole must be produced. Then, using the adjustment screws 28, 30, the probe platform 16 is adjusted until the center axis C is directly over or co-linear with the magnetic axis 26a (through a process described more fully herein).

Once the center axis C is aligned directly over the magnetic axis 26a, the secondary probe platform 32 is removed so that a drill bit 40 may drill through the probe platform 16 and work piece platform 14 to produce a hole in the work piece 36. It will be understood that additional drill guide members may be put in place of the secondary probe platform 32 to increase the precision of the drilling step performed by the drill bit 40 as it proceeds through the magnetic indexer 10.

Once the hole is produced through the work piece 36 and the beam 38, the magnet 26 is removed during a clean up process of the internal area. Furthermore, the magnetic indexer 10 is then removed from the work piece 36 by pressurizing the vacuum attachment members 12 to remove the magnetic indexer 10 from the work piece 36. Then, any appropriate fastener is used to affix the work piece 36 permanently to the beam 38.

The exact location of the magnet 26 is determined by locating the magnetic axis 26a which is a north-south (N-S) pole axis of the magnet 26. The magnetic axis 26a, also termed the center or field axis, of the magnet 26 is the center of the magnetic field and the area where the magnetic field is the strongest. The magnet 26 is placed on the beam 38 so that the magnetic axis 26a is substantially perpendicular to the surface of the beam 38. Therefore, once the work piece 36 is affixed to the beam 38, the magnetic axis 26a is also perpendicular to the surface of the work piece 36. Additionally, the work piece 36 should not interfere with the magnetic field produced by the magnet 26. It will be understood, however, that as long as the magnetic field of the magnet 26 is powerful enough for the probes 18, 20, 22 to sense the field produced by the magnet 26, the work piece 36 may be formed of virtually any non-magnetic material.

It will be understood that a reference to a single probe 18 in the following description is exemplary of each of the probes 18, 20, 22 and its description as a single probe is merely for clarity. The probe 18 is affected by, that is the probe 18 senses, the magnetic field produced by the magnet 26. One exemplary probe type is a Hall-Effect probe. In the Hall-Effect probe 18, the magnetic field produced by the magnet 26 creates a voltage when a current is running perpendicular to the field in the Hall-Effect probe 18. The Hall-Effect probe 18 measures the induced voltage produced due to the magnetic field of the magnet 26. Knowing the induced voltage, and the current, the strength of the magnetic field is determined using the equation $V_H$ned/I=B. According to the equation, $V_H$ is equal to the Hall-voltage, n is equal to the charge carrier density, e is equal to the electronic charge, d is equal to the strip width, and I is equal to the current. This equation results in B which is the strength of magnetic field. Once the strength of the magnetic field is known by use of the Hall-Effect probe 18, the location of the magnetic axis 26a may be determined. The closer the Hall-Effect probe 18 is to the magnetic axis 26a, the greater the response in the Hall-Effect probe 18. According to the first embodiment, the magnetic axis 26a is located co-linear with the center axis C of the probes 18, 20, and 22 when the response by each of the probes 18, 20, and 22 is substantially equal.

The processor 34 determines and processes the affect produced on each of the probes 18, 20, and 22. The display device 35 displays the affect determined by the processor 34. The processor 34 may also indicate which way the probe platform 16 should be moved, using the adjustment screws 28, 30, to correctly position the center axis C over the magnetic axis 26a. Then, once each of the probes 18, 20, 22 indicates an equivalent response, it is known that the center axis C is positioned directly over the magnetic axis 26a. At this point, the display indicates that the center axis C is over the magnetic axis 26a and that the operator should make no further adjustments. In particular, the center axis C is co-linear with the magnetic axis 26a of the magnet 26. Once it is displayed that the center axis C is over the magnetic axis 26a, the secondary probe platform 32 is removed so that the drill point or bit 40 may be introduced to produce the desired hole.

Figure 5:
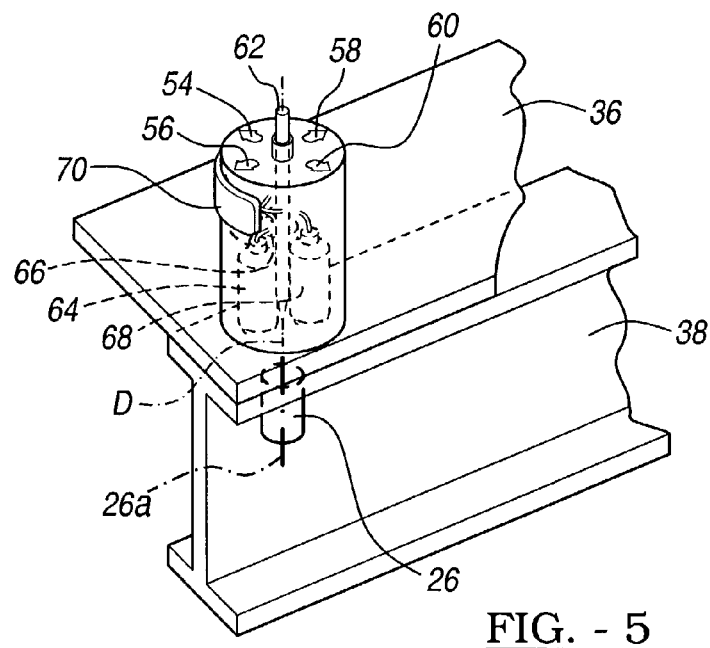
FIG. 5 is a perspective view of a magnetic indexer according to a second embodiment of the present invention.

With reference to FIG. 5, a second embodiment of a magnetic indexer system 50 includes a moveable sensor canister 52 with directional or signaling LEDs 54, 56, 58 and 60 affixed to the top of the moveable canister 52. Each LED 54, 56, 58, and 60 may include an array of LEDs such that a strength of the response in a particular direction can be indicated. Placed centrally and along a center axis D is a marker 62 which extends through the moveable canister 52 to selectively engage the work piece 36. The center axis D relates to probes 64, 66 and 68 as center axis C relates to probes 18, 20, 22 according to the first embodiment.

Each of the probes 64, 66 and 68 are connected to a processor 70. The probes 64, 66 and 68 work substantially similarly to the probes 18, 20 and 22 described in reference to the first embodiment. The processor 70 also works similar to the processor 34 discussed above. In the magnetic indexer 50, however, the processor 70 determines the location of the center axis D relative to the magnetic axis 26a and illuminates the appropriate LED 54, 56, 58 and 60 indicating the direction the moveable canister 52 must be moved to properly align the center axis D with the magnetic axis 26a. Once the center axis D is placed substantially co-linear with the magnetic axis 26a of the magnet 26, all four LED arrays 54, 56, 58 and 60 illuminate to show that the center axis D is properly aligned over the magnetic axis 26a. That is, when all four LEDs 54, 56, 58, 60 are illuminated, they create a visual confirmation that the magnetic axis 26a is positioned substantially co-linear with the center axis D. At this point, the marker 62 may be depressed to form a mark at the position on the work piece 36.

Once the mark has been made, the moveable canister 52 is simply removed from the work piece 36 and proper chucks may be affixed to the work piece 36 to ensure that a properly aligned hole is produced in the work piece 36. Again, once the hole is formed through the work piece 36 and the beam 38, the magnet 26 and any debris may be cleaned out of the internal space.

Figure 6:
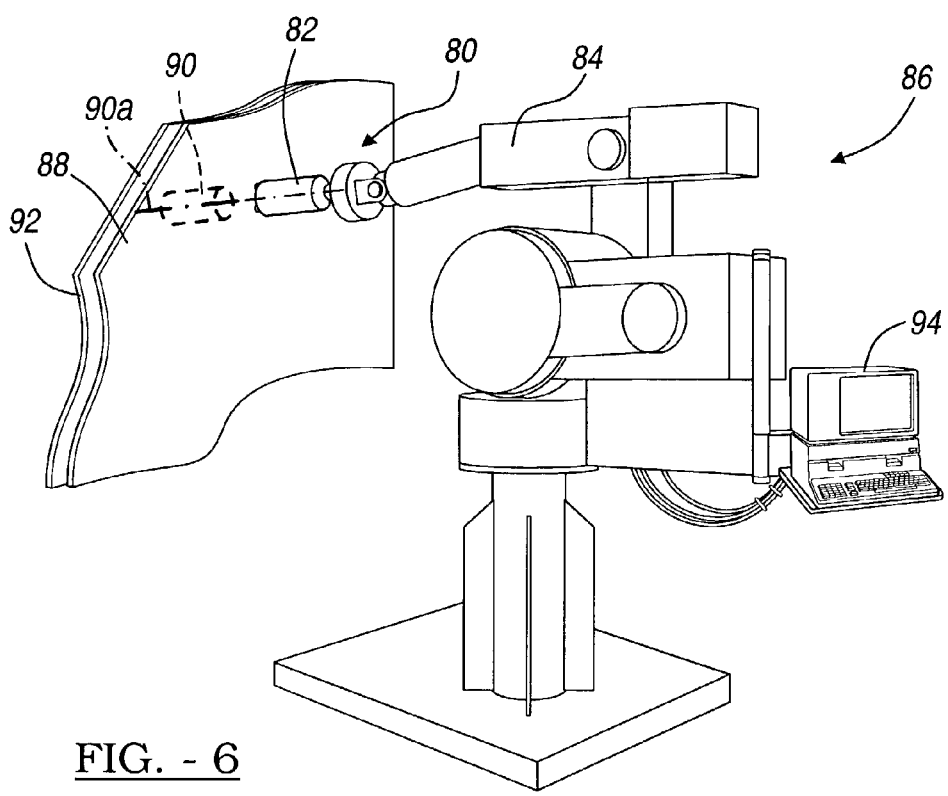
FIG. 6 is a perspective view of a third embodiment of the magnetic indexer affixed to a robot.

With reference to FIG. 6, a third embodiment of a magnetic indexer 80 is illustrated. The magnetic indexer 80 includes a single probe 82 which is affixed to an arm 84 of a robot 86. It will be understood that a plurality of probes can also be used with the robot 86. Only one probe 82, however, is necessary if placed next to the surface 88 in one location and then moved to another location along the surface 88 with an exact knowledge of the first location. Therefore, an effective plurality of probes is simulated by simply placing and moving the single probe 82 and exactly recalling the previous placements, and the field measurements, for each of the previous placements.

A magnet 90, which produces a magnetic field having a central magnetic axis 90a, is placed near the surface 88 opposite the magnetic indexer 80. A processor 94 determines the response of the probe 82 and controls the robot 86. In this way, the robot 86 can quickly locate the magnetic axis 90a, of the magnet 90, affixed to the support sheet 92. It will be understood, however, that separate processors may be used to determine the location of the magnetic axis 90a and control the robot 86. In addition, once the processor 94 has determined the exact location of the magnetic axis 90a, a tool may be placed on the robot arm 84 to produce the hole required. It will also be understood that a plurality of arms may extend from the robot 86 so that once the position of the magnetic axis 90a is located, a tool arm simply rotates in place with a tool extending from the tool arm to produce the hole in the surface 88. When a robot 86 is used, producing a hole serves to confirm that the magnet 90 has been properly located.

It will be understood that each embodiment of the present invention does not require a Hall-Effect probe. Any probe which is sensitive to or which can detect the magnetic field produced by the magnet 26, 90 may be used in the present invention. One alternative probe is a Three-Axis Magnetic Sensor Hybrid HMC2003 produced by Solid State Electronics Center, a division of Honeywell. The other portions of the magnetic indexer 10 are reproduced while simply replacing the Hall-Effect probe 18 with the alternative probe. If the alternative probe, such as the HMC2003, is able to determine a magnetic axis in more than one relative axis, then only one probe may be necessary on the magnetic indexer 10. It is still understood, however, that the single alternative probe still defines a central probe axis for determining the magnetic axis 26a, 90a. The alternative probe is still able to detect the field produced by the magnet 26, 90 and is able to indicate the magnetic axis 26a, 90a.

It will also be understood that the magnet used in the present invention must have their magnetic axis 26a, 90a properly and precisely aligned. Therefore, it may be desirable to first test the magnet 26, 90 using the magnetic indexer 10 to ensure that the magnetic axis 26a, 90a is properly aligned so that when the magnet 26, 90 is affixed to the beam 38 or the support sheet 92, the magnetic axis 26a, 90a is substantially perpendicular to the surface of the work piece 36, 88. This is because only when the magnetic axis 26a, 90a is produced substantially perpendicular to the surface is the strength of the field weakened sequentially as one moves away from the magnetic axis 26a, 90a. It is the magnetic field acting upon the probes which is sensed by the probes 18, 20, 22; 64, 66, 68; and 82, which are used to determine where the magnets 26, 90 are positioned. If the magnetic axis 26a, 90a is angled to the surface (i.e., not perpendicular), the magnetic field would also not be perpendicular and the precise location of the magnetic axis 26a, 90a could not be correctly determined.

In addition, the magnetic indexer itself can be calibrated or zeroed. This means that the central axis of the magnetic indexer can be precisely determined before performing any tasks with the indexer. Generally, a magnetic source having a known magnetic axis can be placed at a zeroed position relative to the magnetic indexer, so that the magnetic indexer can be zeroed to that magnetic axis. After this, the precise zeroed position of the magnetic indexer is known and even greater preciseness can be attained with the magnetic indexer to locate a magnetic axis.

The preferred embodiments of the present invention thus provide a means to quickly and precisely detect the locations where holes need to be drilled in a work piece based on previously made hole location determinations that are otherwise not visible to an operator or optical detection machine. The preferred embodiments also allow for the precise detection of any non-visible landmark as well. That is, the present invention may be used to determine edges of hidden pieces as well. The present invention is especially well suited for aircraft manufacturing applications, but it will be appreciated that the invention will find utility in a wide variety of other manufacturing applications as well.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for determining a location of a device that produces a magnetic field having a magnetic axis and varying strengths depending upon a lateral distance from the device, the system comprising:
   a probe adapted to be affected by and produce a signal based upon the strength of a field strength produced by the device to assist in locating the device;
   a processor to receive said signal to determine the field strength affecting said probe;
   a confirmation system to provide a physical confirmation that said processor has determined the location of the magnetic axis with said probe;
   a permanent magnet having a field defining an axis positioned in a substantially enclosed area such that said probe is operable to be affected by said permanent magnet;
   a robot; and
   a control system for controlling said robot,
   said probe being movable by said robot, and said control system being responsive to said processor to control said robot to move said probe until said processor has determined the location of the device.

2. The system of claim 1, wherein the field produced by the device is a magnetic field and said probe senses the magnetic field to determine the strength of the magnetic field, such that an output of said probe indicates when said probe is positioned closer to the magnetic axis.

3. The system of claim 2, wherein said processor determines the magnetic field sensed by said probe.

4. The system of claim 1, wherein a plurality of said probes are included and spaced apart about a center axis, wherein each of said probes is affected by the field substantially simultaneously.

5. The system of claim 4, wherein:
   said plurality of probes are spaced equidistantly;
   a center of the field is located substantially collinear with the magnetic axis when each of said probes is affected substantially equally by the field; and
   wherein said processor determines when each of said probes is affected substantially equally by the field.

6. The system of claim 5, wherein said confirmation system produces a display which confirms said center axis being substantially collinear with the magnetic axis.

7. The system of claim 6, wherein said display comprises a light emitted by a light-emitting-diode or a graphical display.

8. A system to determine a location of a device through a surface of a work piece, the system comprising:
   a permanent magnet selectively mounted relative to a first side of the work piece;
   a magnetic field, produced by said magnet, comprising a magnetic axis, where said magnetic axis is substantially perpendicular to a first surface of the work piece;
   a platform;
   a plurality of probes spaced apart and affixed to said platform, said probes and said platform being moveable relative to a mounting structure fixable to the work piece, said probes being positionable on a second surface of the work piece, wherein said probes are arranged to define a center axis and are affected by said magnetic field;
   a processor to determine the affect produced in each of said probes by said magnetic field, said affect on said probes being greatest when said center axis is substantially collinear with said magnetic axis;
   said processor adapted to determine a position of said magnet by sensing the affect of said magnetic field on said probes and producing a signal when said center axis is substantially collinear with said magnetic axis;
   said mounting structure including a first axis adjustment and a second axis adjustment for moving said platform relative to said mounting structure while said mounting structure remains substantially fixed.

9. The system of claim 8, wherein said affect on said plurality of probes is substantially equivalent when said center axis is substantially collinear with said magnetic axis.

10. The system of claim 8, further comprising:
    a display device,
    wherein said signal produces a physical confirmation of said signal.

11. The system of claim 8, further comprising:
    a confirmation system to produce a physical confirmation of the location of said magnetic axis.

* * * * *